(12) United States Patent
Paxton et al.

(10) Patent No.: US 10,520,588 B2
(45) Date of Patent: Dec. 31, 2019

(54) MAINTAINING CLEAN LASER LENS WINDOWS USING LIGHT ABSORBING MATERIALS

(71) Applicant: Ford Global Technologies, LLC, Dearborn, MI (US)

(72) Inventors: William Arthur Paxton, Dearborn, MI (US); Kerrie Nikaido Holguin, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 347 days.

(21) Appl. No.: 15/484,862

(22) Filed: Apr. 11, 2017

(65) Prior Publication Data

US 2018/0292515 A1 Oct. 11, 2018

(51) Int. Cl.
 *G01S 7/48* (2006.01)
 *G01S 7/481* (2006.01)
 (Continued)

(52) U.S. Cl.
 CPC .......... *G01S 7/4813* (2013.01); *B05D 3/007* (2013.01); *B05D 3/06* (2013.01); *B05D 5/08* (2013.01);
 (Continued)

(58) Field of Classification Search
 CPC .......... G01S 7/483; G01S 17/08; G01S 17/89; G01S 17/023; G01S 17/10; G01S 7/4817;
 (Continued)

(56) References Cited

U.S. PATENT DOCUMENTS

| 9,323,051 B2 | 4/2016 | Weiller et al. |
| 2012/0188625 A1* | 7/2012 | Sandner ............... G01J 5/026 359/213.1 |

(Continued)

FOREIGN PATENT DOCUMENTS

| DE | 10142802 A1 | 3/2003 |
| DE | 102015006287 A1 | 12/2015 |
| EP | 2605043 A1 | 6/2013 |

OTHER PUBLICATIONS

Fabian, J et al., "Near-Infrared Absorbing Dyes", Chem. Rev., 1992, pp. 1197-1226, vol. 92, No. 6.

(Continued)

*Primary Examiner* — Luke D Ratcliffe
(74) *Attorney, Agent, or Firm* — Geoffrey Brumbaugh; Brooks Kushman P.C.

(57) ABSTRACT

Laser sensor lenses and methods for maintaining clean laser sensors lenses are disclosed. One method may include applying a coating having first and second components to an exterior surface of a lens of a laser sensor, the first component including a thermogenic light-absorbing (TLA) material; and irradiating the TLA material from a light source within the laser sensor to generate heat from the TLA material to cause the second component to form an active coating. The light source may be a laser of a LiDAR sensor. The heat from the TLA material may cause the second component to cure, solidify, or undergo a phase change. The active coating may be at least one of hydrophobic, oleophobic, and hydrophilic. In another embodiment, a removable cover having a TLA material may be positioned proximate the lens window and irradiated to heat the lens window (e.g., to melt ice thereon).

20 Claims, 3 Drawing Sheets

(51) Int. Cl.
  *G02B 1/18*    (2015.01)
  *B05D 3/00*    (2006.01)
  *B05D 3/06*    (2006.01)
  *B05D 5/08*    (2006.01)
  *G02B 1/12*    (2006.01)

(52) U.S. Cl.
  CPC .............. *G01S 7/4815* (2013.01); *G02B 1/12* (2013.01); *G02B 1/18* (2015.01)

(58) Field of Classification Search
  CPC .......... G01S 7/497; G01S 17/936; G01S 5/22; G01S 17/87; H01L 27/14643
  See application file for complete search history.

(56) References Cited

U.S. PATENT DOCUMENTS

| | | |
|---|---|---|
| 2014/0268335 A1 | 9/2014 | Weiller et al. |
| 2014/0300888 A1 | 10/2014 | Duffey et al. |
| 2015/0090291 A1 | 4/2015 | Na et al. |
| 2016/0121855 A1 | 5/2016 | Doorley et al. |
| 2016/0146721 A1 | 5/2016 | Ji et al. |
| 2018/0284274 A1* | 10/2018 | LaChapelle ............. G01S 7/483 |

OTHER PUBLICATIONS

Molina, M et al., "Polymeric near-infrared absorbing dendritic nanogels for efficient in vivo photothermal cancer therapy", Nanoscale, 2016, pp. 5852-5856.

* cited by examiner

MAINTAINING CLEAN LASER LENS WINDOWS USING LIGHT ABSORBING MATERIALS

TECHNICAL FIELD

The present disclosure relates to maintaining clean laser lens windows (e.g., LiDAR) using light absorbing materials, for example, near-infrared light absorbing materials.

BACKGROUND

Light Detection And Ranging (LiDAR) technology may be used to measure the distance to a target or targets by illuminating the target(s) with a laser light and measuring the time it takes for the laser light to reflect back. The laser light may be emitted in pulses, and multiple laser emitters and detector pairs may be included in a single housing to provide a high number of data points and cover a large field of view. LiDAR may be used in many applications, such as surveying, aerial mapping, agriculture, archaeology, speed detection, and others. The developing autonomous vehicle industry also often utilizes LiDAR technology for object detection and navigation. LiDAR sensors, sometimes packaged and referred to as a "puck," may use multiple lasers operating in the near infrared and detectors to determine the position of the vehicle with high levels of accuracy and precision. These high levels of precision are required for safe level 4 autonomous operation—The automated system can control the vehicle in all but a few environments such as severe weather. The driver must enable the automated system only when it is safe to do so. When enabled, driver attention is not required. LiDAR is expected to also be involved in level 5 autonomous operation, wherein other than setting the destination and starting the system, no human intervention is required. Typically, one or more LiDAR sensors are mounted on the exterior of the vehicle, for example, on the roof and/or side view mirrors, for optimal range of detection.

SUMMARY

In at least one embodiment, a method is provided. The method may include applying a coating having first and second components to an exterior surface of a lens of a laser sensor, the first component including a thermogenic light-absorbing (TLA) material; and irradiating the TLA material from a light source within the laser sensor to generate heat from the TLA material to cause the second component to form an active coating.

The light source within the laser sensor may be a near-infrared laser. In one embodiment, the laser sensor is a LiDAR sensor and the near-infrared laser is the same laser the LiDAR sensor uses to measure distance. The near-infrared laser may be operated at full power during the irradiating step. The near-infrared laser may have a wavelength between 750 and 1,250 nm. The heat generated by the TLA material may cause the second component to cure, solidify, or undergo a phase change. In one embodiment, the active coating may be at least one of hydrophobic and oleophobic. In another embodiment, the active coating is hydrophilic. Irradiating the TLA material may include controlling the light source to irradiate the coating in a pattern such that a corresponding pattern is formed in the active coating. The light source may be controlled to form a patterned coating having an array of spaced apart peaks.

In at least one embodiment, a laser sensor is provided. The sensor may include a housing, an internal light source, and a lens; and a coating on an exterior surface of the lens, the coating including a thermogenic light-absorbing (TLA) material that is configured to generate heat when irradiated with light from the internal light source.

The coating may be at least one of hydrophobic, oleophobic, and hydrophilic. In one embodiment, the internal light source is a near-infrared laser and the TLA material is configured to generate heat when irradiated with near-infrared light. The internal light source may be a first internal light source and the sensor may further include a second internal light source. In one embodiment, the first and second internal light sources are both near-infrared lasers and the TLA material is configured to generate heat when irradiated with near-infrared light from the first and second internal light sources. In another embodiment, the first internal light source has a non-infrared wavelength and the second internal light source has a near-infrared wavelength.

In at least one embodiment, a method is provided. The method may include positioning a thermogenic light-absorbing (TLA) material proximate to a lens of a laser sensor; and activating a light source within the laser sensor to irradiate the TLA material to generate heat and increase a temperature of the lens. The TLA material may be positioned proximate to an outer surface of the lens or an inner surface of the lens. In one embodiment, the laser sensor is a LiDAR sensor coupled to a vehicle and the positioning and activating steps are performed when the vehicle is stationary.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
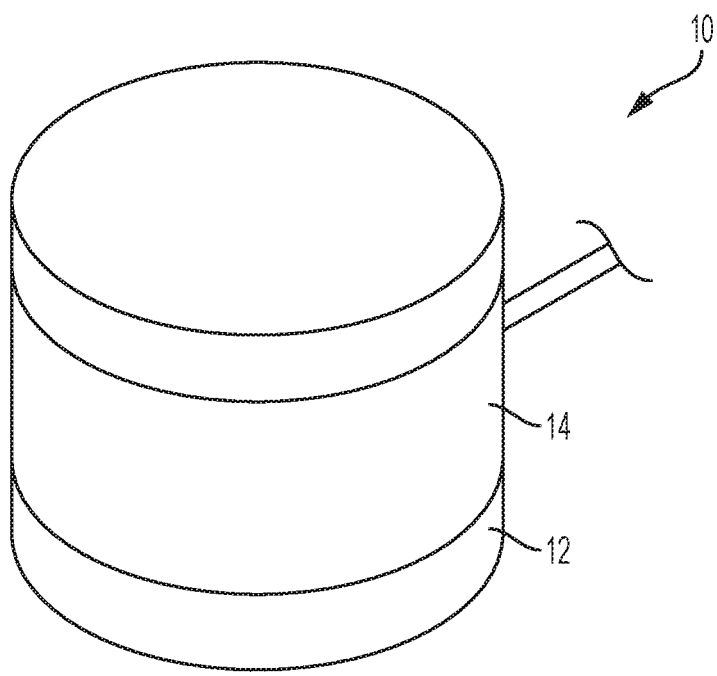
FIG. 1 is a schematic perspective view of a LiDAR sensor, according to an embodiment.

With reference to FIG. 1, an example of a laser sensor 10 is shown. In one embodiment, the laser sensor 10 may be a LiDAR sensor. The sensor 10 is referred to as a LiDAR sensor in the following description, however, this is merely for illustrative purposes. The present disclosure may apply to any laser-based sensor having a lens that is exposed to outdoor elements or otherwise susceptible to becoming dirty. The sensor 10 includes a housing 12 and a lens or window 14. The interior of the sensor may include laser emitters and detectors. The laser light may be emitted through the lens 14 and the reflected light may return through the lens 14 and be received by the detectors. The internal components and operation of LiDAR sensors and systems are known in the art and will not be described in detail. In general, the LiDAR sensor emits laser light at a certain wavelength, such as 600-1000 nm, through a lens. The laser may be pulsed at a certain frequency, such as 1-50 kHz. The laser light is reflected by objects around the sensor and returns to the sensor where it is received by detectors. The detectors, also known as photodetectors, may be solid state photodetectors or photomultipliers. A high number of data points may therefore be generated in a short time period. The data may be analyzed using on-board processors or it may be sent to a different processor, such as a vehicle computer. The data may be used to image a region surrounding the LiDAR sensor. This imaging may be included as part of an autonomous driving system, for example, in cooperation with cameras, GPS, or other guidance/imaging systems.

As described above, LiDAR sensors are often mounted on the exterior of a vehicle, for example, on the roof and/or side view mirrors. The positions of these sensors may present some serious challenges, such as harsh weather and environmental conditions throughout the vehicle's lifetime. The sensors may be subjected to extreme temperatures, wind, moisture, ultraviolet light, dust, road debris, insects, and other items. Many of these conditions can lead to the sensor lens getting partially or completely blocked or obscured, thus hindering the performance of the sensors. In addition to (or instead of) being covered, the sensors may also be scratched, chipped, or knocked off.

Accordingly, the ability to maintain a clean lens for a LiDAR sensor is important for the functional operation and commercial success of autonomous vehicles that use LiDAR technology. If a sensor gets dirty or otherwise covered to the point where an imminent object cannot be detected, the vehicle's guidance system may not be able to operate safely with the reduced environmental knowledge. A total failure of the guidance system also becomes a possibility if the blockage is severe and persistent. Furthermore, LiDAR sensors can represent a significant portion of the costs of the autonomous vehicle system, therefore, it may not be economically feasible or practical to have redundant sensors. Instead, vehicle manufacturers would prefer to minimize the number of onboard LiDAR sensors to reduce costs.

One approach to maintaining a clean LiDAR lens has been mechanically cleaning the lens through physical wiping. For example, a mechanical washer system may include one or more robotic wiper arms and nozzles that will spray a cleaning solution and mechanically wipe the surface. This system may be similar to the washer system on a windshield, but may be modified to manage the curved surface of the sensor. This approach works passively and reactively by removing obstructions only after they have adhered to the sensor.

In at least one embodiment, an alternative approach is to actively prevent obstructions by applying a coating on the lens. In one embodiment, an organic or inorganic coating may be applied to the exterior of the lens window to create a surface that is less favorable for moisture and/or particulate matter to adhere to. An active coating may therefore work on its own or in conjunction with a passive system, such as a wiper arm. However, it has been found that such active coatings may be subject to degradation. A degraded active coating may not provide the surface characteristics that are desired and, in some instances, could perform worse than a surface without any active coating.

Figure 2:
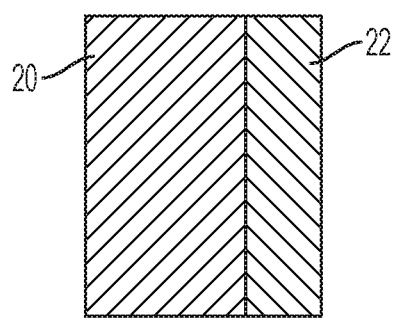
FIG. 2 is a schematic cross-section of a coating applied to a LiDAR sensor lens, according to an embodiment.

With reference to FIG. 2, in at least one embodiment, a durable active or functional coating 22 for a LiDAR lens or window 20 is disclosed. The active/functional coating 22 may have a long lifetime, such as the lifetime of the vehicle, and/or it may be easily restored or replaced (e.g., in the field). In at least one embodiment, the coating 22 may be a hydrophobic and/or oleophobic coating, for example, super hydrophobic and/or oleophobic. The coating 22 may also be omniphobic, which is a coating that repels water, oils, and other substances. In one embodiment, the coating 22 may have a contact angle with water and/or oils of at least 90 degrees, for example, at least 125 degrees or at least 150 degrees (super hydro/oleo/omni-phobic). Repelling water and/or oils may also make the coating 22 resistant to accumulation of particulate matter, which may be carried or suspended by the water/oil. Alternatively, it has also been found that hydrophilic coatings may also repel or prevent buildup of particulate matter. Without being held to any particular theory, it is believed that hydrophilic coatings may prevent particulate buildup due to in part to photocatalysis, wherein light exposure breaks down impurities. In addition, water may wash away the impurities by forming sheets due to the low contact angles. Any of the above coatings may be incorporated into the active/functional coating 22 and may be referred to as repellant or self-cleaning coatings.

In one embodiment, the coating 22 may include at least two components. One component may be a thermogenic light-absorbing component or material. A thermogenic light-absorbing material may be a material that generates heat or increases in temperature when exposed to light, for example, light of a certain wavelength. While all materials may increase in temperature by a nominal amount when exposed to electromagnetic radiation, as used herein, a thermogenic material may generate heat or increase in temperature by a significant degree when exposed to light (e.g., relative to the amount or mass of the material).

The thermogenic light-absorbing (TLA) material may be any suitable material that generates a significant amount of heat when exposed to a certain type of light. The TLA material may be a material that generates heat when exposed to the type (e.g., wavelength) of light used by the LiDAR sensor for distance measurement. In one embodiment, the light source used by the LiDAR sensor may be infrared light, which may have a wavelength/spectrum from 700 nm to 1 mm. Infrared is a fairly broad spectrum and may be broken into smaller sub-sets. Wavelengths that are near to the visible spectrum may be referred to as near infrared (NIR). The definition of NIR may vary depending on the source, however, as used herein it refers to light with a wavelength of 750 to 2,500 nm. The LiDAR sensor may use a laser that operates in an even smaller sub-set of this definition, such as 750 to 1,250 nm, or any sub-range therein, such as 800 to 1,100 nm, 850 to 1,050 nm, or 850 to 950 nm. The laser may operate at a specific wavelength within the above ranges.

Accordingly, the TLA material may be a material that generates heat when exposed to light having one or more of the above wavelengths. In one embodiment, the TLA material may generate heat when exposed to NIR light. The TLA material may be configured to generate heat by the same light source used by the LiDAR sensor laser. If multiple light sources are used in the LiDAR sensor for distance sensing, the TLA material may be configured to generated heat when exposed to one, some, or all of the light sources used for distance sensing. In another embodiment, the TLA material may be a material that generates heat when exposed to light having a different wavelength than the light source used to sense distance. The material may generate heat only from the different wavelength light or more than one type/wavelength of light may cause the TLA material to generate heat. For example, the TLA material may generate heat in response to exposure to UV light (e.g., 10 to 400 nm), either in addition to, or instead of, generating heat in response to NIR light. If the TLA material is configured to generate heat in response to a type of light not used by the LiDAR sensor for sensing distance, a separate, additional light source may be included within the LiDAR sensor for the purpose (e.g., sole purpose) of illuminating the TLA material.

The TLA material may be an organic material, an inorganic material, or a combination thereof. In one embodiment, the TLA material may be formed as particles, such as nanoparticles. Non-limiting examples of inorganic materials that may be used in or as the TLA material may include carbon nanotubes, magnetic nanomaterials, precious metal (e.g., gold, silver, or Pt-group) nanoparticles, or others.

In another embodiment, the TLA material may be (or include) an organic material. The organic material may be a dye, gel, or other form of polymer. In one embodiment, the TLA material may be a dendritic nanogel, which is a high molecular weight crosslinked polymers that combines the characteristics of dendritic polymers with crosslinked macroscopic gels. The dendritic nanogel may be in the form of soluble particles having a size of, for example, between 20 and 200 nm. One example of a thermogenic dendritic nanogel is poly(N-isopropylacrylamide) (PNIPAM) based NG crosslinked with dendritic polyglycerol (dPG) and semi-interpenetrated with polyaniline (PANT). Other examples of organic thermogenic materials may include phthalocyanines and naphthalocyanines; metal complexes; polymethines; diphenylmethane, triphenylmethane, and related compounds; quinones; azo dyes; chromophoric systems; and radical organic compounds. Examples of such organic TLA materials are described in, for example, J. Fabian et al., Near-Infrared Absorbing Dyes, Chem. Rev. 1992, 92, 1197-1226 and M. Molina et al., Polymeric near-infrared absorbing dendritic nanogels for efficient in vivo photothermal cancer therapy, Nanoscale, 2016, 8, 5852-5856, the disclosures of which are hereby incorporated in their entirety by reference herein.

A second component of the coating 22 may be an active or functional component. This component may provide the coating 22 with its hydro/oleo/omni-phobic or hydrophilic properties. In at least one embodiment, the active component may be heat-activated. For example, depending on the type of material, the active component may be cured, hardened, phase-changed, or otherwise undergo a reaction (e.g., chemical or physical reaction) when heated. Accordingly, the active component may be activated by the TLA material when the TLA material is exposed to a light source and generates heat. The heat generated by the TLA material may cause a reaction in the active component to form the coating 22 on the lens 20. The coating 22 may have the water/oil/particulate repelling properties of the active component once it is formed by the interaction between the TLA material and the active component. The finished coating 22 may be transparent to the light source of the LiDAR sensor that is used to sense distance (e.g., NIR laser), and may therefore not interfere with the operation of the LiDAR sensor.

The active component may be any material that has the repellant properties described above (e.g., hydro/oleo/omni-phobic or hydrophilic) and that requires heat energy to cure, harden, phase-change, or otherwise undergo a reaction (e.g., chemical reaction). The active component may be an organic material, an inorganic material, or a combination thereof. Non-limiting examples of repellant (e.g., hydro/oleo/omni-phobic) materials that may be used as, or as part of, the active component may include fluoropolymers or organosilanes (functional silica). Examples of hydrophobic silanes may include methyl, linear alkyl, branched alkyl, fluorinated alkyl, aryl, dipodal, or others. Non-limiting examples of hydrophilic materials that may be used as, or as part of, the active component may include organosilanes and/or titanium dioxide-based coatings. Examples of hydrophilic silanes may include polar, hydroxylic, ionic, charge inducible/charge switchable, embedded hydrophilicity, masked, or others.

Figure 3:
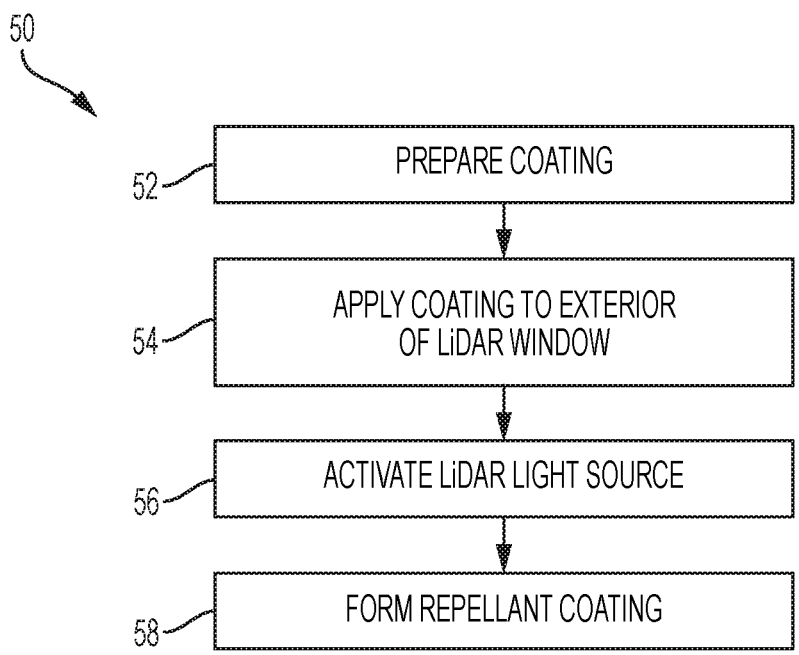
FIG. 3 is an example flowchart of a method for applying a coating to a LiDAR sensor lens using an internal light source, according to an embodiment.

With reference to FIG. 3, an example of a flowchart 50 is shown for a method of forming a repellant coating on a LiDAR lens/window. In step 52, the coating may be prepared. As described above, the coating may have multiple components, which may include a thermogenic light-absorbing (TLA) material and an active component. In one embodiment, those may be the only components. In another embodiment, those may be the only components other than materials used to apply or deliver those components, such as solvents, solutions, suspensions, slurries, etc. The support materials may not remain after the coating is applied (e.g., evaporated during application). The preparation of the coating may depend on the type of materials used for the TLA material and active component. For example, an organic component may have different preparation than an inorganic component. One of ordinary skill in the art, based on the present disclosure, will understand that the preparation of the components may vary based on the materials involved.

In step 54, the coating may be applied to the exterior of the LiDAR lens or window. The coating may be applied to a portion or all of the exterior surface of the lens. In one embodiment, it may be applied to a whole portion of the lens that forms the field of view of the LiDAR sensor. For example, this may be up to or exceeding 180°, up to 360°, or the entire 360°. The application will again depend on the type of materials used in the coating. In one embodiment, the TLA material and the active component may be mixed together prior to application. The two components may therefore be dispersed within each other, for example, uniformly mixed together, before applying to the lens. In another embodiment, the components may be applied separately. For example, the TLA material may be applied first (e.g., directly onto the lens) and then the active component may be applied second (e.g., onto the TLA material), or vice versa. Applying the TLA material first may allow for maximum light (e.g., NIR) exposure to the TLA material from within the LiDAR sensor. After the application, the coating may be in an intermediate state, for example, it may be uncured, not completely solidified, or otherwise not in its final physical and/or chemical state.

In step 56, a light source (or sources) from within the LiDAR sensor (e.g., on the opposite side of the lens from the coating) may be activated or controlled to emit light, which may then contact the intermediate coating applied in step 54. In at least one embodiment, the light source(s) that are activated may be the same light source or sources used by the LiDAR sensor to sense and determine distances. In one embodiment, the light source may be a near infrared (NIR) light source, such as a laser. As described above, LiDAR sensors may have one or more NIR laser sources included therein. For example, there may be a plurality of lasers, such as at least 5, 10, or more lasers. In some designs, there may be one, several, or more lasers that are configured to rotate around a vertical axis to provide an increased field of view (e.g., at least 180° or up to 360°). In other designs, the laser source may be a stationary source configured to emit laser beams in multiple directions. These lasers may be solid-state lasers and may emit a large number of laser beams to have a large field of view (e.g., at least 180° or up to 360°).

In another embodiment, one or more light sources other than the distance-sensing light source(s) in the LiDAR sensor may be used. The light source(s), which may be referred to as secondary light sources, may be used in addition to, or instead of, the distance-sensing light source(s). The secondary light source may have the same wavelength (e.g., NIR) or a different wavelength than the distance-sensing (primary) light source(s). For example, the secondary light source may be a different wavelength than the primary light source, such as ultraviolet (UV), visible, or another portion of the infrared spectrum. In another embodiment, the secondary light source may have the same, or substantially the same, wavelength as the primary source. The secondary light source may have a higher power or intensity.

Accordingly, during step, the primary and/or secondary light source(s) may be activated to emit light energy on the intermediate coating. The light energy may cause the TLA material to generate heat, which may in turn activate the active component of the coating. As a result, the coating may be cured, hardened, transformed, or otherwise converted into its final shape, properties, and/or state. The activation and/or control of the light sources may be performed by hardware and/or software in the LiDAR sensor itself or by a connected computer system. For example, the vehicle computer system that performs the autonomous driving system may also control the process 50, or any individual step therein. Alternatively, there may be a separate control system, including hardware (e.g., processor) and software, for operating and controlling the light sources.

In one embodiment, the primary light source or sources may be used to activate the TLA material. As described above, the primary light source may include one or more lasers that are used by the LiDAR system to detect and measure distance. One, a portion, or all of the lasers may be used to activate the TLA material such that it generates heat. The number of lasers that are used may depend on their power/intensity and the amount of heat generation desired from the TLA material. In one embodiment, all primary light sources (e.g., lasers) may be turned on and caused to emit light during step 56. The lasers may be rotated or they may be stationary, similar to when used for distance measuring. The lasers may be controlled such that all portions of the lens having the intermediate coating applied thereon may be illuminated or contacted by the lasers. The control system may control the lasers to contact each portion of the coating for a certain amount of time. The exposure time may depend on the type of TLA material, type of active component, the thickness of the coating, or other parameters. One of ordinary skill in the art will understand, based on the present disclosure, that the lasers may be controlled to contact the coating for a time sufficient to cause the coating to be converted to its final form (e.g., cured, solidified, reacted, etc.).

In another embodiment, the secondary light source or sources may be used to activate the TLA material. The secondary light source may be used on its own or in addition to the primary light source(s), as described above. The secondary light source may be a similar light source to the primary light source, such as a laser. If the secondary source is the same type (e.g., wavelength) as the primary source, it may be a higher power/intensity light source. In one embodiment, the lasers may both be a NIR laser. However, the secondary light source may also be a different light source type, such as ultraviolet, visible, or a different portion of the infrared spectrum. Similar to the primary source, the secondary light sources may be controlled by the LiDAR system, the vehicle computer system, or any other connected processor. The secondary sources may similarly be controlled to illuminate the entire coating and may be controlled to illuminate the coating for a sufficient time to cause the desired change in the intermediate coating. In addition, both light sources (or portions of each) may be operated at the same time to provide a higher level of energy/power/intensity to the coating than the primary sources are capable of doing alone.

In step 58, the coating may be formed following the exposure to the internal LiDAR light source(s). As described above, the coating in its final form may be cured, solidified, or otherwise transformed from the intermediate coating prior to light exposure. The finalized coating may be hydro/oleo/omni-phobic or hydrophilic, as described previously. Accordingly, if the coating is hydro/oleo/omni-phobic, it may form very high contact angles (e.g., >90, 120, or 150 degrees) with water, oil, other substances, or particulate matter therein. Alternatively, if the coating is hydrophilic, it may form very low contact angles (e.g., <90, 60, 30, 15, or 5 degrees) with water or particulate matter therein.

The process 50 may be performed initially during the manufacturing of the LiDAR sensor and/or autonomous vehicle to which it is attached. However, the process 50 may also be applied as an aftermarket process or as a repair for a previous coating application (of the same coating or a different one). One advantage of the process 50 is that because it uses an internal light source it may be easily performed by a third party (e.g., repair shop) or even the owner of the vehicle. The coating just needs to be prepared and applied to the lens and the LiDAR or vehicle control system may control the light sources to cure, harden, etc. the coating into a new or repaired coating. Accordingly, if the coating is degraded over time, chipped, damaged, or otherwise impaired, it may be re-applied or repaired in the field. For example, process 50 may be applied to a lens/window that has previously had the same or a different coating thereon. The previous coating may be removed, to the extent possible, or the new coating may be applied over the previous coating.

Figure 4:
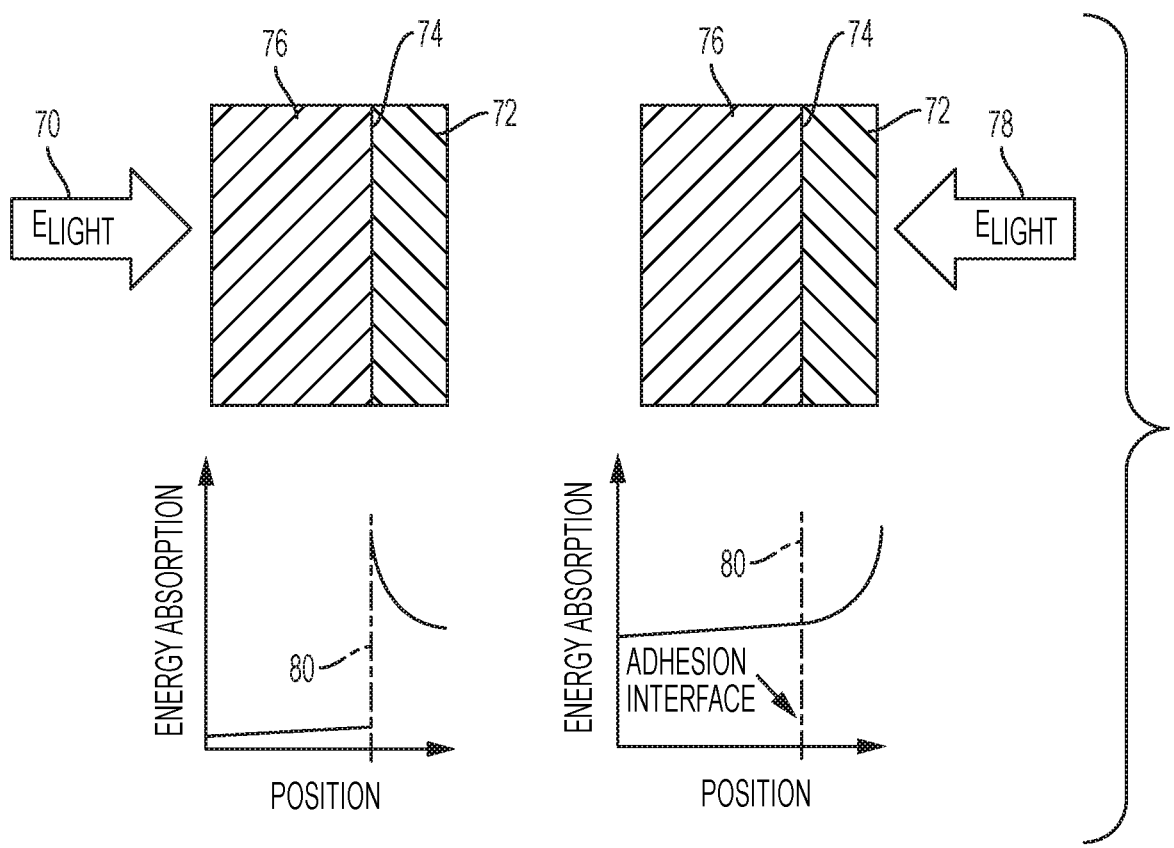
FIG. 4 is a schematic example of a coating applied using an internal light source and energy absorption thereof compared to a coating applied using an external light source.

With reference to FIG. 4, a schematic diagram is shown comparing the disclosed method of using an internal light source 70 to cure/harden/convert a coating 72 on an external surface 74 of a lens 76 to a method in which an external source 78 is used to perform the same reaction. A schematic plot of the energy absorption vs. position is shown for each method, with the disclosed method on the left and the alternative method on the right. As shown, the disclosed method provides maximum energy absorption by the coating at the interface 80 between the coating 72 and the lens 76. This is because the lens 76 is transparent to the light from the light source 70 and therefore passes through the lens 76 and contacts the portion of the coating 72 that is right at the interface 80 first. In contrast, if the light source is external to the LiDAR lens, the light must first pass through the bulk of the coating 72 before it reaches the coating/lens interface 80. This may result in a weaker adhesion between the coating and the lens than in the disclosed method.

Figure 5:
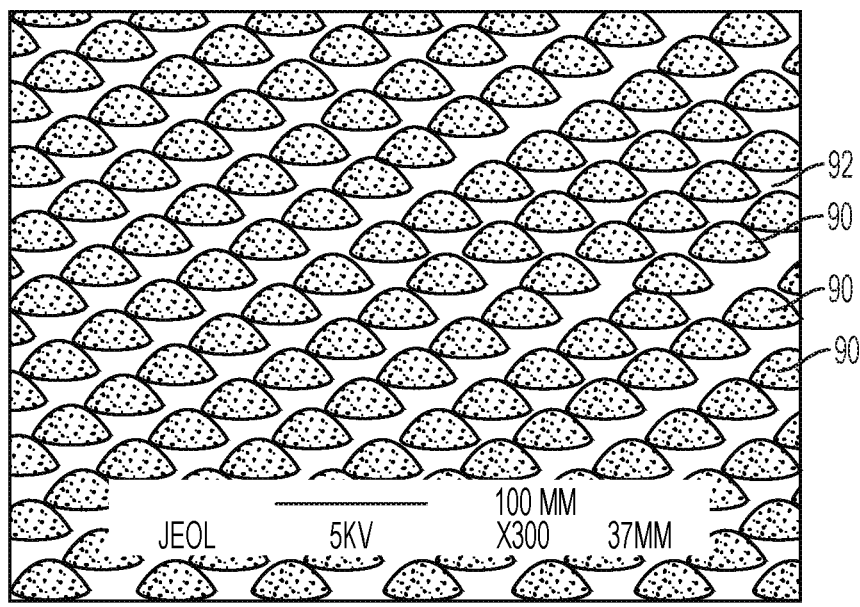
FIG. 5 is a schematic perspective view of a textured repellant coating on a LiDAR lens surface, according to an embodiment.

With reference to FIG. 5, in at least one embodiment, the process described above may be modified to form a patterned coating 90 on the LiDAR lens/window 92. The coating 90 may be formed of the same material or materials as those described above. In one embodiment, however, the primary and/or secondary light sources may be controlled to form a textured or patterned coating on the surface instead of a substantially uniform thickness coating (e.g., as shown in FIGS. 2 and 4). Textured coatings have been found to be hydro/oleo/omni-phobic based on reduced contact angle between the coating and the substance (e.g., water or oil). The textured coating 90 may have an array of spaced apart peaks with valleys in between. The peaks may be relatively steep/sharp, such that air becomes trapped between the hydrophobic peaks/texture (under the water/liquid). This may create a very high contact angle between the coating and the substance. In one embodiment, the texture (e.g., peak height and/or spacing) may be on the nanoscale (e.g., having a height/spacing dimension that is less than 1 µm, such as less than 100 nm).

The primary and/or secondary light sources may be controlled to form coatings such as those described above and shown in FIG. 5. The light source(s) may be pulsed in order to form a pattern in the coating. For example, by only exposing certain portions of the coating to the light, only those portions of the coating may be cured, solidified, etc. fully or to a significant extent. The portions not exposed to the light, or exposed to a reduced dosage, may not cure, solidify, etc. at all or only partially. Accordingly, portions of the intermediate coating that receive a high level of exposure may form a relatively thick final coating and portions that receive little or no exposure may form a relatively thin final coating or no coating. The final coating may therefore have a textured surface with peaks and valleys that may provide repelling properties in addition to those provided by the coating chemistry or composition.

Figures 6A, 6B:
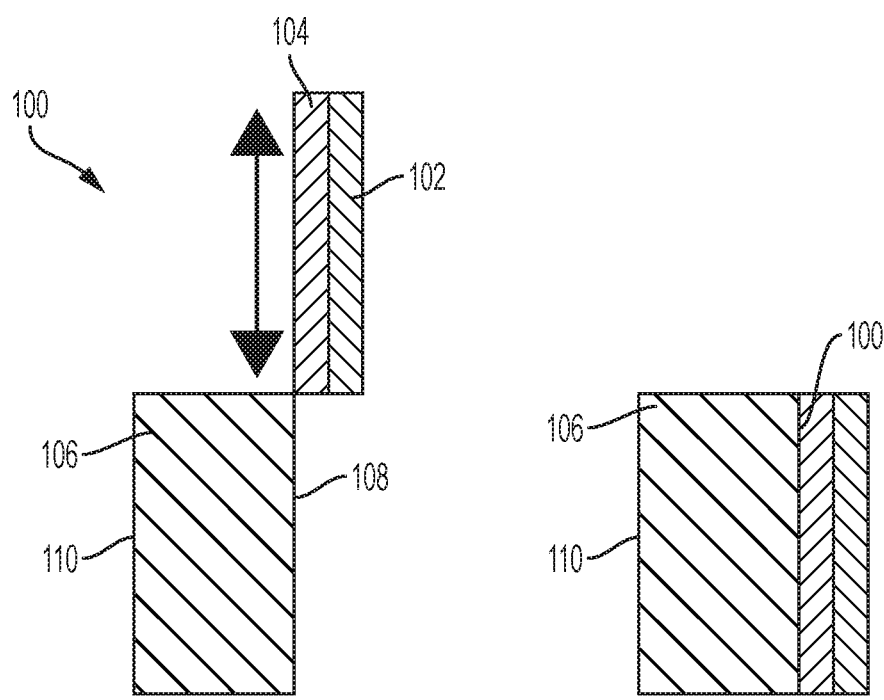
FIGS. 6A and 6B show a retractable element for heating a LiDAR lens in a retracted position (FIG. 6A) and an extended position (FIG. 6B), according to an embodiment.

With reference to FIGS. 6A and 6B, in at least one embodiment, a retractable or removable element 100 may be provided. The retractable element 100 may be in addition to, or instead of, the coating on the LiDAR lens disclosed above. The retractable element 100 may include a substrate 102 and a coating 104 on a surface of the substrate 102. The coating 104 may be formed of or include a TLA material, which may be the same or similar to the materials disclosed above.

With reference to FIG. 6A, the retractable element 100 is shown in a retracted position wherein it is not covering or in contact with the LiDAR lens 106. The retractable element 100 is shown as disposed above the lens 106, however, it may be in any position where it does not block, occlude, or contact the lens 106. For example, it may be retracted above the lens 106, below the lens 106, or to the side of the lens 106. The retractable element 100 may also be completely removed from the LiDAR lens 106, for example, it may be part of a sleeve, cap, or other cover that may be completely removed from the LiDAR sensor or may be attached but pivotally or otherwise moved from a retracted to an extended position. One of ordinary skill in the art will understand, based on the present disclosure, that the retractable element 100 may be moved into position and retracted using any suitable mechanism. For example, an electric motor and corresponding mechanical linkages may be used to move the retractable element 100 between the retracted position and the extended position. Alternatively, the retractable element 100 may be manually positioned and transitioned between the two positions.

With reference to FIG. 6B, the retractable element 100 is shown in the extended position. In the extended position, the retractable element 100 may be in contact with the outer surface 108 of the lens 106 or in very close proximity (e.g., less than one inch or one cm) thereto. While the retractable element 100 is shown on the outside of the LiDAR lens 106, it may also be disposed within the LiDAR sensor such that it is in contact with, or in close proximity to, the inner surface 110 of the lens 106. As disclosed above, the retractable element 100 may include a coating 104 that includes a TLA material. Accordingly, the light source(s) (primary and/or secondary) described above may be used to activate the TLA material in the coating 104 to generate heat when the retractable element 100 is in the extended position. This heat may be used to melt ice or evaporate water that has accumulated on the lens 106. The heat may also vaporize other materials or films that have adhered or built up on the lens 106.

In one embodiment, the retractable element 100 may be positioned in the extended position when the LiDAR sensor and/or vehicle is not in motion. This may be when the car is parked, as part of a warm-up procedure, as part of a shut-down feature, or any other time when the LiDAR sensor is not being used to navigate the vehicle. Similar to the coating forming processes disclosed above, the activation of the coating 104 may include either the primary light source(s), the secondary light source(s), or both. The light sources may be operated at full or maximum power/intensity to generate the most heat from the TLA material.

In the embodiment shown in FIGS. 6A and 6B, there is a single retractable element 100. However, in other embodiments, there may be a plurality of retractable elements 100. The multiple elements may be individually moved between the retracted and extended positions, or they may move together. In another embodiment, the substrate 102 and coating 104 may be removably fixed in a position that is in contact with or in very close proximity to the lens 106. The substrate 102 may therefore not be routinely removed or retracted when the LiDAR sensor is in operation. This embodiment may be utilized only if the substrate 102 and the coating 104 are transparent to the LiDAR primary light source.

Accordingly, systems and methods are disclosed for preventing and/or eliminating the buildup or adhesion of foreign objects or materials on a LiDAR lens. In some embodiments, a coating may be applied to the lens using one or more LiDAR light sources. The coating may be formed and finalized in situ using the LiDAR light sources by using the light source to generate heat via a thermogenic light-absorbing material in the coating. An active component of the coating may be activated by the heat and may form a finished coating that is repellant to substances like water, oil, or others. In other embodiments, a retractable element having a TLA material thereon may be positioned near to, or in contact with, the lens and may be exposed to light to melt or vaporize substances on the lens. The disclosed systems and methods may be allow for coatings to be applied or repaired in the field and may extend the lifetime of the LiDAR sensors on an autonomous vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method, comprising:
applying a coating having first and second components to an exterior surface of a lens of a laser sensor, the first component including a thermogenic light-absorbing (TLA) material; and
irradiating the TLA material from a light source within the laser sensor to generate heat from the TLA material to cause the second component to form an active coating, the heat generated by the TLA material causes the second component to cure, solidify, or undergo a phase change.

2. The method of claim 1, wherein the light source within the laser sensor is a near-infrared laser.

3. The method of claim 2, wherein the laser sensor is a LiDAR sensor and the near-infrared laser is the same laser the LiDAR sensor uses to measure distance.

4. The method of claim 3, wherein the near-infrared laser is operated at full power during the irradiating step.

5. The method of claim 2, wherein the near-infrared laser has a wavelength between 750 and 1,250 nm.

6. The method of claim 1, wherein the active coating is at least one of hydrophobic and oleophobic.

7. The method of claim 1, wherein the active coating is hydrophilic.

8. The method of claim 1, wherein irradiating the TLA material includes controlling the light source to irradiate the coating in a pattern such that a corresponding pattern is formed in the active coating.

9. The method of claim 8, wherein the light source is controlled to form a patterned coating having an array of spaced apart peaks.

10. A laser sensor, comprising:
a housing, an internal light source, and a lens; and
a coating on an exterior surface of the lens, the coating including a thermogenic light-absorbing (TLA) material configured to generate heat when irradiated with light from the internal light source, and the internal light source is a first internal light source and the sensor further includes a second internal light source.

11. The sensor of claim 10, wherein the coating is at least one of hydrophobic, oleophobic, and hydrophilic.

12. The sensor of claim 10, wherein the internal light source is a near-infrared laser and the TLA material is configured to generate heat when irradiated with near-infrared light.

13. The sensor of claim 10, wherein the first and second internal light sources are both near-infrared lasers and the TLA material is configured to generate heat when irradiated with near-infrared light from the first and second internal light sources.

14. The sensor of claim 10, wherein the first internal light source has a non-infrared wavelength and the second internal light source has a near-infrared wavelength.

15. The sensor of claim 10, wherein the coating is at least one of hydrophobic and oleophobic.

16. The sensor of claim 10, wherein the coating is hydrophilic.

17. A method, comprising:
positioning a thermogenic light-absorbing (TLA) material proximate to a lens of a laser sensor; and
activating a light source within the laser sensor to irradiate the TLA material to generate heat and increase a temperature of the lens, the laser sensor is a LiDAR sensor coupled to a vehicle and the positioning and activating steps are performed when the vehicle is stationary.

18. The method of claim 17, wherein the TLA material is positioned proximate to an outer surface of the lens.

19. The method of claim 17, wherein the TLA material is positioned proximate to an inner surface of the lens.

20. The method of claim 17, wherein the light source is a near-infrared light source.

* * * * *